(12) United States Patent
Mueck et al.

(10) Patent No.: US 10,104,662 B2
(45) Date of Patent: Oct. 16, 2018

(54) LICENSED SHARED ACCESS REVERSE LINK AND MESSAGE FEEDBACK CONTROL

(71) Applicant: Intel Corporation, Santa Clara, CA (US)

(72) Inventors: Markus Dominik Mueck, Unterhaching (DE); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/575,168

(22) Filed: Dec. 18, 2014

(65) Prior Publication Data
US 2016/0183259 A1    Jun. 23, 2016

(51) Int. Cl.
| | | |
|---|---|---|
| *H04W 4/00* | (2018.01) | |
| *H04W 72/04* | (2009.01) | |
| *H04L 5/00* | (2006.01) | |
| *H04W 16/14* | (2009.01) | |

(52) U.S. Cl.
CPC ....... *H04W 72/0453* (2013.01); *H04L 5/0098* (2013.01); *H04W 16/14* (2013.01)

(58) Field of Classification Search
CPC ..................................................... H04W 4/00
See application file for complete search history.

(56) References Cited

U.S. PATENT DOCUMENTS

| | | | | |
|---|---|---|---|---|
| 7,414,981 B2* | 8/2008 | Jaramillo | ............... | H04L 51/18 370/252 |
| 8,825,595 B2* | 9/2014 | Shu | ........ | H04W 24/08 370/235 |
| 2010/0284304 A1* | 11/2010 | Mao | ..................... | H04L 63/0428 370/254 |
| 2013/0295948 A1* | 11/2013 | Ye | ..................... | H04W 72/0453 455/452.1 |
| 2014/0011509 A1 | 1/2014 | Markwart et al. | | |
| 2014/0162617 A1* | 6/2014 | Mueck | .................. | H04W 8/245 455/418 |
| 2014/0256345 A1* | 9/2014 | Arefi | ..................... | H04W 16/14 455/454 |
| 2014/0321425 A1 | 10/2014 | Mueck et al. | | |

(Continued)

FOREIGN PATENT DOCUMENTS

| | | |
|---|---|---|
| CN | 107950045 | 4/2018 |
| WO | WO-2014078676 A2 | 5/2014 |
| WO | WO-2014110161 A1 | 7/2014 |

OTHER PUBLICATIONS

"International Application Serial No. PCT/US2015/063793, International Search Report dated Feb. 26, 2016", 9 pgs.

(Continued)

*Primary Examiner* — Mohammad Anwar
*Assistant Examiner* — Angel Brockman
(74) *Attorney, Agent, or Firm* — Schwegman Lundberg & Woessner, P.A.

(57) ABSTRACT

A licensed shared access (LSA) Message Feedback controller device is configured to convey reverse link messages from an LSA controller to one or more target incumbent frequency licensees. The LSA controller is configured to control LSA frequency spectrum availability for use by eNodeBs of a wireless communication system.

32 Claims, 5 Drawing Sheets

(56) References Cited

U.S. PATENT DOCUMENTS

| | | | | |
|---|---|---|---|---|
| 2014/0357218 | A1* | 12/2014 | Andrianov | H04W 16/14 455/406 |
| 2015/0181601 | A1* | 6/2015 | Schmidt | H04W 12/08 370/329 |
| 2015/0230098 | A1* | 8/2015 | Li | H04W 16/10 455/454 |
| 2015/0351148 | A1* | 12/2015 | Jha | H04W 76/028 455/436 |

OTHER PUBLICATIONS

"International Application Serial No. PCT/US2015/063793, Written Opinion dated Feb. 26, 2016", 5 pgs.

* cited by examiner

LICENSED SHARED ACCESS REVERSE LINK AND MESSAGE FEEDBACK CONTROL

TECHNICAL FIELD

Embodiments described herein generally relate to wireless networks. Some embodiments relate generally to operators, supporting licensed shared access (LSA) bands, to initiate reverse link messages in a wireless network. Some embodiments relate to 3GPP LTE networks.

BACKGROUND

A Licensed Shared Access (LSA) concept was developed by the Radio Spectrum Policy Group (RSPG) in Europe to address the difficulty of identifying further dedicated frequency spectrum beyond available cellular bands. The LSA concept includes mechanisms for introducing shared spectrum based solutions. These solutions include mobile cellular operators having access to additional licensed spectrum from other primary users (e.g., public safety, government) that they normally would not get access to. The primary uses may be referred to in the art as incumbents.

In Europe, spectrum in a range of 2.3-2.4 GHz is planned to be made available for LSA usage. This spectrum may be referred to in the art as Long-Term Evolution (LTE) Band 40 that is a Time Division Duplex (TDD) band.

The current LSA architecture consists mainly of a unidirectional flow of information from the incumbent (i.e., primary spectrum user) to the cellular operator, via an LSA controller, regarding whether frequency spectrum is available. The current LSA architecture, however, does not include mechanisms for the cellular operator to initiate message exchanges.

There are general needs for improving shared spectrum-based solutions.

DETAILED DESCRIPTION

Subsequent reference to LSA architecture/spectrum is defined as any spectrum sharing under a licensing agreement. For example, this may include the European LSA, the United States 3-Tier model, or any other licensed spectrum scheme. In an embodiment, the 3-Tier model may include the tiers of: incumbent access, priority access and general authorized access. Further, the LSA architecture may include a spectrum access system (SAS) incorporating a dynamic database and, potentially, other interference mitigation techniques. The SAS may ensure that Citizens Broadband Service users operate only in areas where they would not cause harmful interference to incumbent users and may also help manage interference protection among different tiers of Citizens Broadband Service users.

Figure 1:
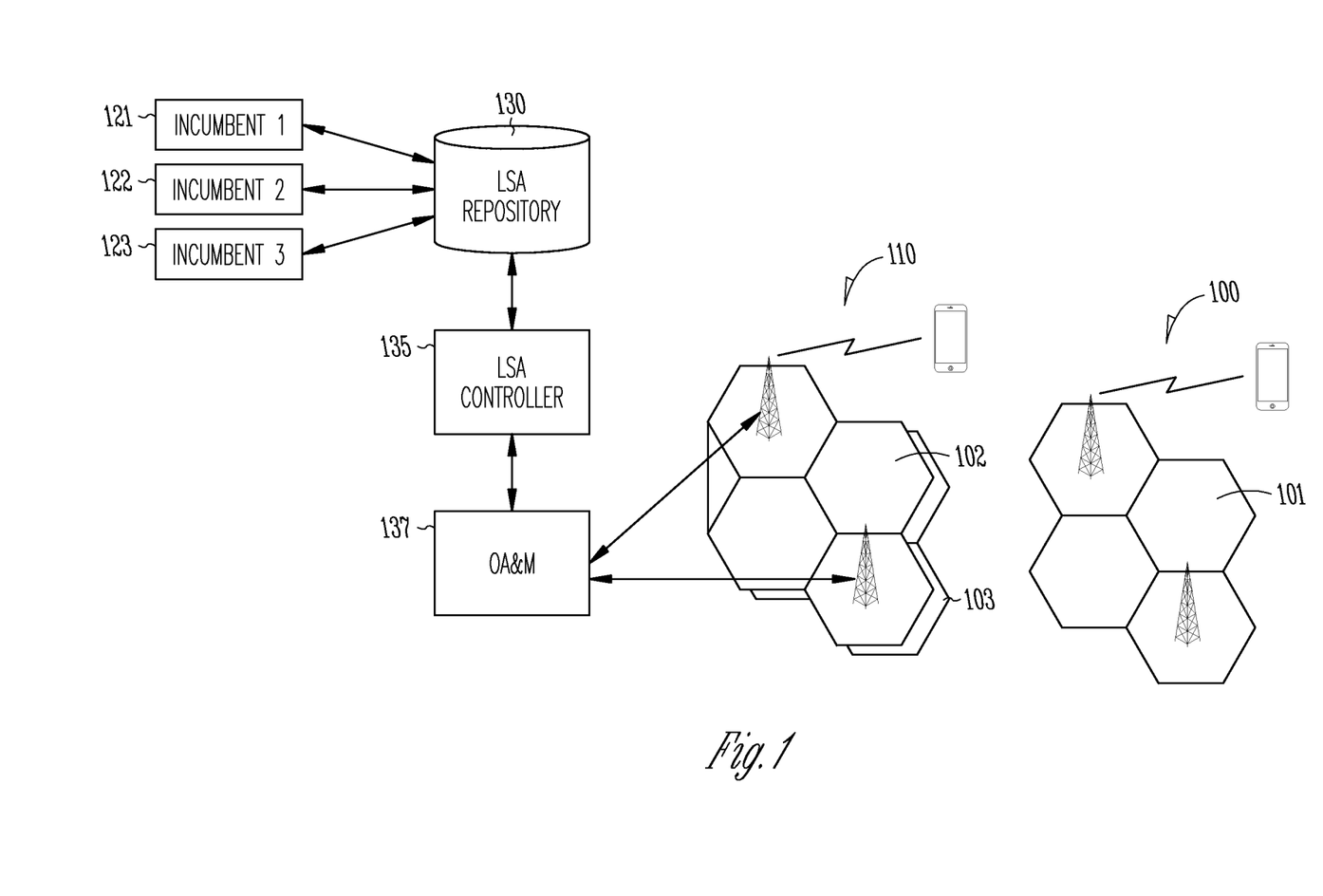
FIG. 1 illustrates a radio access network system diagram using an LSA architecture.

FIG. 1 illustrates a system diagram of an LSA architecture. In the current architecture the flow of information is in one direction, from the incumbent to the LSA licensee or the cellular operator.

The system includes a cellular system 100 that uses only a licensed frequency spectrum 101 and a cellular system 110 that uses both a cellular licensed frequency spectrum 102 and the LSA frequency spectrum 103.

A plurality of incumbents 121-123 share access to an LSA repository 130. The LSA repository 130 provides a shared database of frequency spectrum.

An LSA controller 135 is coupled to the LSA repository 130 to control information on LSA spectrum availability over time, space, and frequency. The LSA controller 135 can check the repository 130 and messages from the incumbents 121-123 and take appropriate action.

An operation administration and maintenance (OA&M) block 137 is coupled between the LSA controller 135 and the network infrastructure. The OA&M block 137 handles management of the LSA licensed spectrum by translating information regarding spectrum availability into radio resource management commands from the LSA controller 135.

Spectrum sharing includes a bilateral agreement between the incumbent and the LSA licensee. The agreement outlines all the details of the spectrum that is to be shared. There can be different forms of the bilateral agreement outlining different levels of predictability. Examples of the bilateral agreements include: fixed times, statistical availability of spectrum, and the right to reclaim the spectrum. An incumbent 121-123 may update the LSA Repository 130 regarding the availability of the particular spectrum to which it has licensing rights.

The LSA controller 135 may check the repository 130 and other messages from the incumbent 121-123 and take appropriate action. The controller 135 may periodically check the repository 130 and send appropriate messages to the LSA licensee and incumbent 121-123 if needed. For instance, if frequency spectrum becomes available, the LSA controller 135 informs the LSA licensee about the availability. The LSA controller 135 may also send acknowledgements back to the incumbent 121-123 from the cellular operator. If there is a message by the incumbent to reclaim spectrum, the message is conveyed to the LSA licensee.

One problem with this LSA flow is that the LSA repository 130 is the only entity with direct interactions between the LSA system and incumbents 121-123. However, the LSA repository 130 is not designed for a point-to-point real-time information exchange between a specific LSA licensee and a specific incumbent 121-123. Rather, the LSA repository 130 is designed to provide generic availability information for a given LSA frequency band from an incumbent to all LSA licensees having a license agreement with the incumbent for the given frequency band. The LSA repository 130 is therefore unsuitable for handling the flow of confidential/sensitive data from one given LSA licensee to one concerned incumbent.

In order to address this reverse link messaging problem, as well as other problems, various embodiments use an LSA Message Feedback (LSA-MFB) controller 200 device (see FIG. 2) that conveys reverse link messages securely from the cellular operator to one or more target incumbents. While subsequent discussion of this entity 200 uses the reference LSA-MFB controller 200 for purposes of clarity and brevity, this entity and/or function may be any entity and/or function configured to convey reverse link messages.

Figure 2:
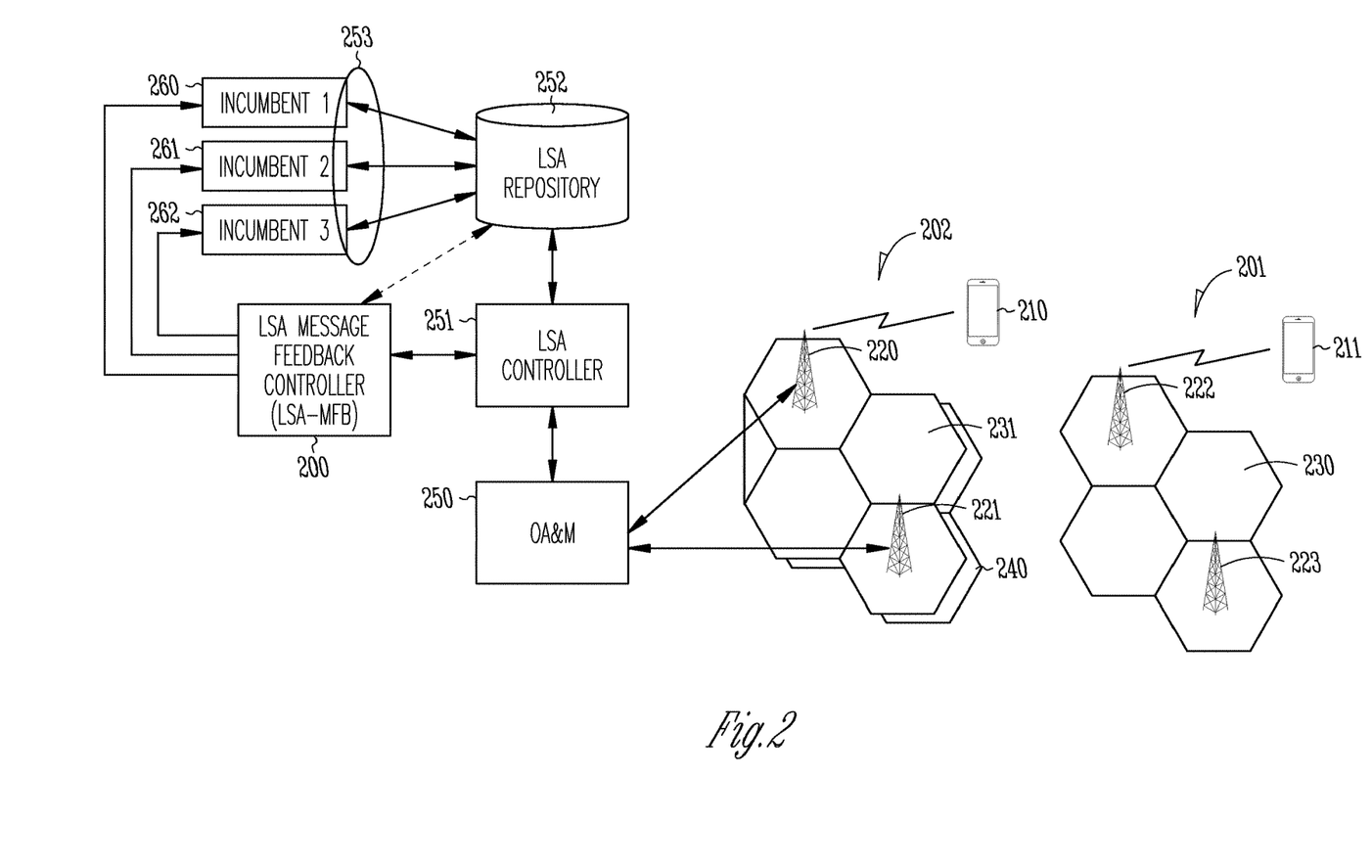
FIG. 2 illustrates an embodiment of a radio access network system diagram using an LSA architecture with an LSA-Message Feedback Controller in accordance with some embodiments.

Operator feedback information typically is highly confidential. For example, information on emergency reclaim time intervals may give direct indications on the structure of the network for the concerned operator. Further, if the operator requests spectrum from the incumbent to alleviate peak traffic, and this information is observed by a competitor, it will give the competitor insight into the operator's network and its weaknesses. Operators are particularly sensitive to this. It is thus important that the information flow from the LSA system to the various incumbents be controlled by a corresponding entity. The LSA-MFB controller 200 is configured to control this information flow.

FIG. 2 illustrates an embodiment of a radio access network system diagram using an LSA architecture with the LSA-MFB Controller 200. The system uses the LSA-MFB controller 200 to control confidential reverse link traffic from the cellular operators to the incumbents.

The system includes a cellular system 201 that uses only a licensed frequency spectrum 230 and a cellular system 202 that uses a cellular licensed frequency spectrum 231 overlaid on the LSA frequency spectrum 240. The LSA frequency spectrum includes frequency spectrum from the incumbents 260-262.

Each of the cellular systems 201, 202 include a plurality of cellular base stations 220-223 (e.g., evolved node B (eNodeB, eNB)) for communicating with user equipment (UE) 210, 211 within their cell boundaries. The bases stations 220-223 may define cells, microcells, picocells, and/or femtocells.

The UE 210, 211 may be multi-band devices in order to be able to take advantage of the LSA frequency spectrum. Thus the UE 210, 211 may have the ability to operate not only in the licensed frequency spectrum but in any possible LSA spectrum.

The plurality of incumbents 260-262 (e.g., primary spectrum users) share access to an LSA repository 252. The LSA repository 252 is a database that contains the relevant information on spectrum use by the incumbents in the spatial, frequency, and time domains. The LSA repository 252 may also include indications of incumbent identifications and communication protocols used by those incumbents. Non-confidential feedback 253 to incumbents may be given directly from the LSA repository 252 for requests initiated by the incumbents 260-262. Any confidential reverse link requests issued by the cellular system operators that are fed back to the incumbents are passed through the LSA-MFB controller 200. There may be one or more LSA repositories 252 per country.

An LSA controller 251 is coupled to the LSA repository 252 to control information on LSA spectrum availability over space, frequency, and time. The LSA controller 251 can check the repository 252 and messages from the incumbents 260-262 and take appropriate action. The LSA controller 251 may compute LSA spectrum availability based on rules built upon LSA rights use and information on the incumbent's use provided by the LSA repository 252. The LSA controller 251 is coupled to the LSA repository through a secure interface. The LSA controller 251 may interface with one or more LSA repositories 252 as well as with one or more LSA networks 240. The LSA controller 251 is coupled to and communicates directly with the LSA-MFB controller 200. There may be one or more LSA controllers 251 per country.

An operation administration and maintenance (OA&M) apparatus 250 is coupled between the LSA controller 251 and the network infrastructure (e.g., base stations 220-223). The OA&M block 250 handles management of the LSA licensed spectrum by translating information regarding spectrum availability into radio resource management commands from the LSA controller 251. These commands may then be transmitted to the base stations 220, 221 in the LSA licensee's network 240. Based on this information, the base stations 220, 221 may then enable UE to access the LSA spectrum or order the UE to hand off seamlessly to other frequency bands as appropriate to LSA spectrum availability, quality of service (QoS) requirements, data rates, and/or data plans. Information from the OA&M block 250 enables the base stations 220-223 to tune to different channels or to power down.

A cellular operator's OA&M 250 is responsible for ensuring that only the appropriate base stations 220, 221 are transmitting in the LSA spectrum and can access this information from the LSA controller 251 that collects the information relevant for the particular area, time, and incumbent from the LSA repository 252. UE 210 located in the area where the LSA spectrum is available may have access to the licensed frequency band 231 and/or the LSA frequency band 240. UE 211 located in an area where the LSA frequency band 240 is not available has access only to the licensed frequency band 230.

The LSA-MFB controller 200 is coupled between and communicates with the LSA controller 251 and the incumbents 260-262. In an embodiment, the LSA-MFB controller 200 is coupled to the LSA repository 252.

The LSA-MFB controller 200 is shown in FIG. 2 as a separate entity. However, the LSA MFB controller may be considered from a functional architecture perspective or an implementation architecture perspective.

In the functional perspective, the LSA-MFB controller 200 may operate as described previously. In the implementation perspective, the LSA-MFB controller 200 may be: i) a dedicated physical entity (comprising hardware & software) that is added to the infrastructure; ii) an additional software component (e.g., deployed in conjunction with some processing hardware such as a computation motherboard) included in the LSA Controller 251 and/or the LSA Repository 252; iii) an additional hardware entity that is located in the LSA Repository 252 and/or the LSA Controller 251; iv) an additional software component located in the OA&M 250, the LSA Controller 251, and/or the LSA Repository 252. The portion of the LSA-MFB controller function 200 in the LSA Repository 252 may receive triggers for initiating specific information exchanges with specific incumbents while those triggers are managed in the portion of the LSA-MFB controller 200 in the LSA Controller 251.

Figure 6:
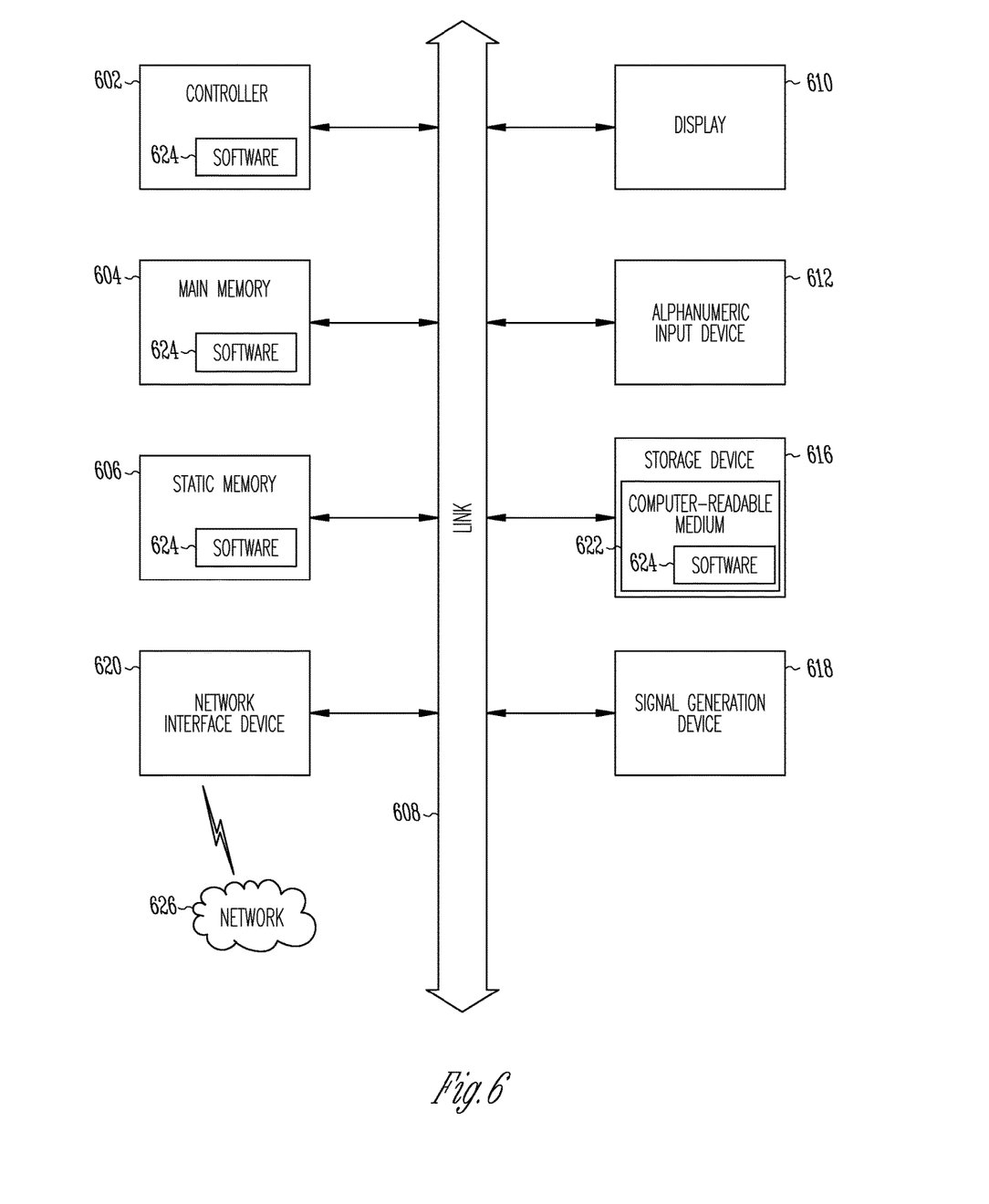
FIG. 6 illustrates a block diagram of an embodiment of an apparatus in accordance with some embodiments.

The LSA-MFB controller 200 may be hardware modules that are controlled by software, as illustrated in FIG. 6 and discussed subsequently. In the split functionality embodiment, the hardware of the LSA controller 251 and/or the LSA repository 252 may execute instructions for the LSA-MFB function as described herein.

If the LSA-MFB controller 200 has a direct link to the LSA Repository 252, the LSA-MFB controller 200 may update the LSA Repository 252 in case of LSA spectrum availability changes (in time, frequency, and/or space) following the information exchange between an incumbent 260-262 and a cellular operator. The LSA-MFB controller 200 may also, in some cases (e.g., low sensitivity information), control routing of data through the LSA Repository 252 to one or more target incumbent(s) 260-262.

The LSA-MFB controller 200, in combination with the LSA controller 251, the LSA repository 252, and incumbents 260-262 provides features not addressed by the LSA architecture of FIG. 1. In one example, when spectrum is made available by the incumbents 260-262, it is assumed that the LSA controller 251 sends appropriate messages to the cellular operator to initiate spectrum transitions. There may be situations where the cellular operator is not using the frequency spectrum in all regions or may not be equipped to do so due to hardware issues in the base stations 220, 221. The LSA-MFB controller 200 provides mechanisms whereby the cellular operator sends that information back to the incumbents 260-262. The incumbents 260-262 may then make changes to their particular frequency deployment if needed.

For example, the incumbents 260-262 may: i) reclaim the unused/underused spectrum and sell it to another operator; ii) change (e.g., reduce) the price for the unused/underused spectrum in the concerned geographic area, the concerned frequency band and for the concerned period of time; iii) inform the cellular operator about the fact that the spectrum is underused and may announce further steps in case that the concerned cellular operator does not increase the usage level; iv) the incumbents 260-262 may increase the price for the unused/underused spectrum in order to motivate the concerned cellular operator to either use the spectrum or to terminate the licensing agreement; and/or v) identify why the cellular operator does not efficiently use the spectrum (e.g., more suitable frequency bands are available, for example lower carrier frequency bands which have a larger coverage at an identical output power level) and to change the licensing agreement correspondingly, either immediately, if possible, or for the renewal when the licensing period expires.

In another example, if there is an emergency reclaim by an incumbent 260-262, the cellular operator or LSA licensee should release the frequency spectrum correctly. Operation of the LSA-MFB controller 200 enables the cellular operator to send a substantially instantaneous response to the LSA controller 251 and the incumbent 260-262 to indicate receipt of the message and the time by which the frequency spectrum will be released.

In another example, when either the cellular operator or the incumbent 260-262 is using the frequency spectrum, they may experience interference from other users due to malfunctioning equipment or other reasons. Operation of the LSA-MFB controller 200 enables the victim of the interference to report the issue to the LSA controller 251 such that the entity causing the interference may be located and shut down.

In another example, operation of the LSA-MFB controller 200 enables the cellular operator to request additional time or spectrum in any given location. The request may or may not be granted by the incumbent 260-262 but the request may provide for more efficient frequency spectrum usage and as well as a way to satisfy the cellular operator's needs.

Figure 3:
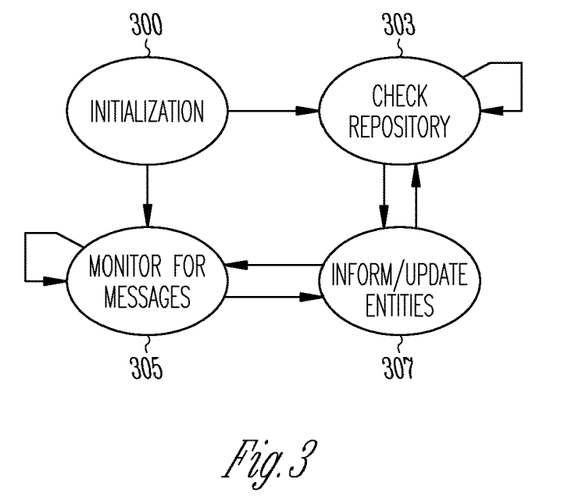
FIG. 3 illustrates a state machine diagram of an embodiment of operation of an LSA controller in accordance with the system of FIG. 2 in accordance with some embodiments.

In order for the cellular operator to raise issues as they come up during steady state system operation or during a frequency spectrum handoff, the LSA controller 251 may include operations as illustrated in the state diagram of FIG. 3. Corresponding modules for this operation are illustrated in the block diagram of FIG. 4.

FIG. 3 illustrates a state machine diagram of an embodiment of operation of the LSA controller 251 in accordance with the system of FIG. 2. In the initialization state 300, the LSA controller is originally set to a basic state. In this state, no information is available (either from monitoring the messages or from checking the LSA repository) and the LSA controller is waiting for external messages to arrive (e.g., monitor for messages state) or to trigger the LSA repository and then to wait for corresponding messages.

From the initialization state 300, the next state may be either the monitor for messages state 305 or the check repository state 303. In the monitor for messages state 305, the LSA controller is monitoring the channel for incoming messages. As described previously, a plurality of messages may come to the LSA controller through the LSA repository, the OA&M and/or directly from the incumbents, National Regulation Administrations (NRAs) and/or other stakeholders. Typically, the external messages may trigger some reconfiguration of the system (e.g., spectrum reclaiming by one or more of the incumbents). The external message may also trigger some delivery of status information (e.g., a typical request by NRAs) or may include offers (typically from one or more incumbents) for granting access to LSA spectrum opportunities.

In the check repository state 303, the LSA controller may trigger the LSA repository to deliver information. This information may include LSA spectrum availability in a given geographic area, for a given period of time and/or for a given frequency band. In another embodiment, the LSA repository may deliver information without receiving a trigger from the LSA controller. For example, if an incumbent performs an emergency reclaiming of the spectrum.

From either the monitor for messages state 305 or the check repository state 303, the next state may be an inform/update entities state 307. In this state 307, depending on the external messages and/or the information from the LSA repository (either triggered or delivered automatically), the LSA controller processes all data in order to identify LSA spectrum usage opportunities (or the requirement to vacate the LSA spectrum) for a given geographical area, for a given period of time, and for a given frequency band. The decision to vacate the LSA spectrum may be communicated to the OA&M of the concerned operator, to the LSA repository, and/or to the concerned incumbent and relevant NRA.

Figure 4:
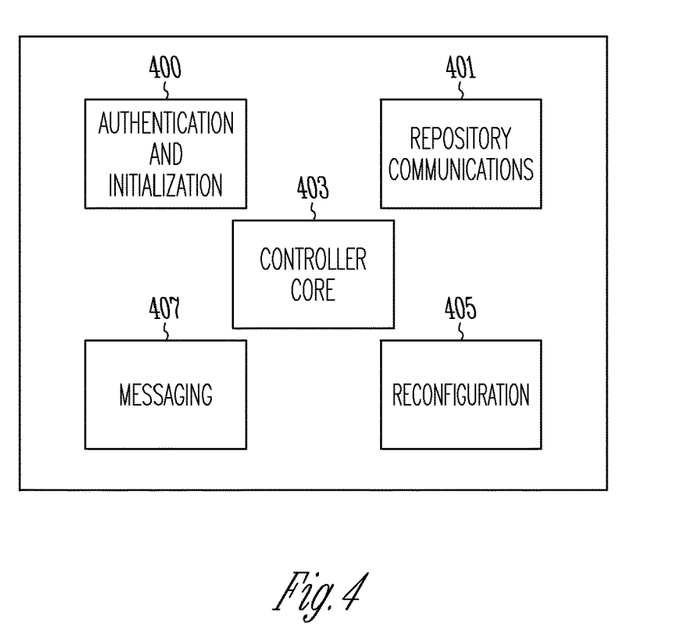
FIG. 4 illustrates a functional block diagram of an embodiment of the LSA controller architecture in accordance with the system of FIG. 2 in accordance with some embodiments.

FIG. 4 illustrates a functional block diagram of an embodiment of the LSA controller 251 architecture in accordance with the system of FIG. 2. This block diagram is for purposes of illustration only since the LSA controller 251 may have additional or fewer functional blocks, depending on the system.

The LSA controller 251 may include a plurality of modules. A module may be defined as hardware, software, or a combination of hardware and software.

An authentication and initialization module 400 is configured to handle the initialization state 300 of FIG. 3. The LSA controller is set to a known state during the initialization phase and initiates authentication for getting access to the LSA repository and/or the relevant OA&M system of the concerned operators.

A repository communications module 401 is configured to handle corresponding communication mechanisms within the system. The repository communications block 401 may provide the LSA repository with triggers, processed information, and/or related decisions and may receive messages from external entities (e.g., NRAs, Incumbents).

A controller core module 403 is configured to process the information from the LSA repository in order to derive LSA spectrum requirement analysis. The controller core module 403 may also process information from incumbents, NRAs, and/or LSA licensees.

A messaging module 407 is configured to provide the function dealing with the above-described monitor for messages state 305 of FIG. 3. This module 407 may create messages to all involved entities, such as LSA Repository, OA&M, NRAs, Incumbents, and/or LSA Licensee.

A reconfiguration block 405 is configured to change the configuration of LSA licensees based on the processed information and/or based on triggers received (e.g., emergency spectrum revocation). The LSA controller derives the need for changing the configuration of LSA licensees. This reconfiguration is typically provided to the concerned LSA licensee through the associated OA&M interface.

The LSA controller may perform repository checking and monitoring in parallel. The messaging unit 407 may be dedicated to handling different messages from an incumbent, regulatory bodies, or cellular operators. The messages originating from the LSA operator that use additional security may be routed via the LSA-MFB controller. The messages may be categorized, based on priority, into one or more of a plurality of categories.

One message category may include messages related to emergency reclaim of spectrum. These messages come from the incumbent and are acknowledged by the cellular operator.

Another message category may include interference management. These messages are from the cellular operator or the incumbent regarding interference from the other party.

Yet another message category may include updates to the repository. This is relevant if the LSA-MFV controller is also responsible for routing messages from the incumbent to the repository, depending on the particular LSA implementation.

Another message category may include message regarding routine availability of spectrum and handovers. These messages may indicate spectrum availability, or lack thereof, and corresponding acknowledgements from the cellular operator.

Another message category may include messages regarding requests from the NRA for repository access. This assumes that the LSA-MFB controller is responsible for handling access to the LSA repository.

Yet another message category may include messages regarding reconfiguration requests. These requests may be from the incumbent in order to reconfigure the operating parameters of the LSA licensee. The operating parameters may include, but not be limited to, power levels, regions of usage, and/or interference thresholds.

Figure 5:
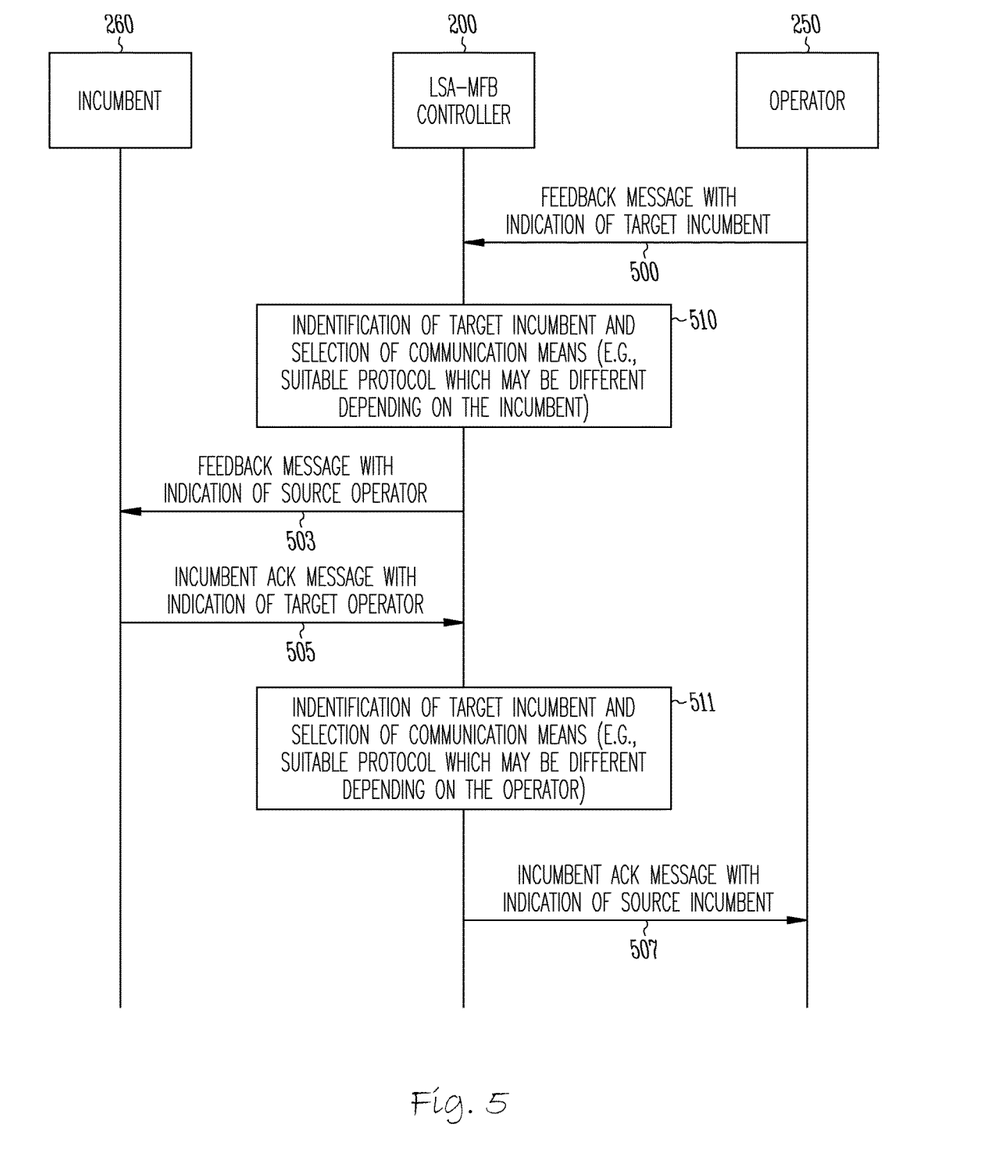
FIG. 5 illustrates a signal flow diagram of an embodiment of message exchange in accordance with the system of FIG. 2 in accordance with some embodiments.

FIG. 5 illustrates a signal flow diagram of an embodiment of message exchange in accordance with the system of FIG. 2. This diagram shows the messaging between a target incumbent 260, the LSA-MFB controller 200, and the cellular operator, as represented by the OA&M block 250. Other embodiments may use another functional block to represent the cellular operator other than the OA&M 250.

The flow begins with the operator 250 transmitting a feedback message 500 to the LSA-MFB controller 200 including an indication of a target incumbent. The operator may know which frequency band would work best to handle overflow traffic and determines, from a database, which incumbent licenses that frequency band. An indication for that target incumbent is included in the message.

The LSA-MFB controller 200 accesses a database 510 to determine an identification for that target incumbent and select a protocol for communication with the target incumbent. The database may include not only the frequency band for each incumbent but the communication protocol used by that particular incumbent.

The LSA-MFB controller 200 forwards the reverse link feedback message 503 to the target incumbent 260. The feedback message 503 now includes an indication of the operator that initially generated the feedback message as well as the indication of each of the one or more target incumbents. The incumbent 260 transmits an acknowledgement message 505 back to the LSA-MFB controller 200 indicating receipt of the feedback message 503.

The LSA-MFB controller 200 accesses a database 511 (e.g., LSA repository) to determine an identification for the target operator to which the acknowledgement message 505 is to be forwarded. The protocol for communication with the target operator is also determined from the database. This protocol may be different for different operators. With this information, the LSA-MFB controller 200 transmits the incumbent acknowledgement message with the indication of the source incumbent 507.

A number of messages may be initiated by a cellular operator/LSA licensee without any trigger by the incumbent. These messages may include information of LSA licensee to incumbent on expected observations/events (e.g., unexpected interference events).

These messages may also include information regarding the LSA licensee to incumbent on proposed renegotiations of the licensing agreement. For example, a message may be sent if the LSA licensee is requesting a time-line extension (or termination/ shortening) of the existing LSA license (most typical are requests from the operator to incumbent for additional spectrum that may not be originally allotted). These messages also include modifications on the geographic availability of LSA spectrum (i.e., remove/add new geographic areas) and the availability of LSA bandwidth (i.e., add/remove spectrum (for a given geographic area) in the existing LSA licensing agreement, etc.).

The messages that may be initiated by a cellular operator/LSA licensee without any trigger by the incumbent may also include information regarding LSA licensee to incumbent on proposed transfer of an LSA spectrum usage agreement (LSA License) to another operator.

Other untriggered messages may include information regarding LSA licensee to incumbent on proposed licensing cost changes. For example, these messages may be sent in case of lower load and/or lower spectrum quality.

Additional untriggered messages may include information regarding LSA licensee to incumbent on detected emergency event. For example, a cellular operator may be informed or forced to make the frequency band available to public safety/PPDR systems in case of a disaster event.

FIG. 6 is a block diagram illustrating an apparatus in the example form of a UE, an access point (AP), an LSA-MFB controller, and/or a cellular base station (e.g., eNodeB) such as illustrated in FIG. 2 or discussed subsequently with respect to base stations of various wireless systems. A set or sequence of instructions may be executed to cause the communication apparatus to perform any one of the methodologies discussed herein, according to an example embodiment.

In alternative embodiments, the communication apparatus operates as a standalone device or may be connected (e.g., networked) to other communication apparatuses. The communication apparatus may be a mobile communication device (e.g., cellular telephone), a computer, a personal computer (PC), a tablet PC, a hybrid tablet, a personal digital assistant (PDA), or any communication apparatus capable of executing instructions (sequential or otherwise) that specify actions to be taken by that communication apparatus. The term "processor-based system" shall be taken to include any set of one or more communication apparatuses that are controlled by or operated by a processor (e.g., a computer) to individually or jointly execute instructions to perform any one or more of the methodologies discussed herein.

Communication apparatus 600 may include at least one controller 602 (e.g., a central processing unit (CPU), a graphics processing unit (GPU) or both, processor cores, compute nodes, etc.), a main memory 604 and a static memory 606 that communicate with each other via a link 608 (e.g., bus). The communication apparatus 600 may further include a display unit 610 (e.g., video, LED, LCD) and an alphanumeric input device 612 (e.g., a keypad, keyboard). In one embodiment, the display unit 610 and input device 612 may be incorporated as one unit as a touch screen display. The communication apparatus 600 may additionally include a storage device 616 (e.g., a drive unit), a signal generation device 618 (e.g., a speaker), a network interface device 620, and one or more sensors (not shown). The network interface device 620 may include one or more radios (e.g., transmitters and receivers) coupled to one or more antennas in order to communicate over a wireless network channel 626.

The storage device 616 includes a computer-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the communication apparatus 600, with the main memory 604, static memory 606, and the processor 602 also constituting computer-readable media.

While the computer-readable medium 622 is illustrated in an example embodiment to be a single medium, the term "computer-readable medium" may include a single medium or multiple media (e.g., a centralized or distributed database, and/or associated caches and servers) that store the one or more instructions 624.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WI-FI™, 3G, and 4G LTE/LTE-A or WiMAX networks). The term "transmission medium" shall be taken to include any intangible medium that is capable of storing, encoding, or carrying out instructions for execution by the communication apparatus, and includes digital or analog communications signals or other intangible medium to facilitate communication of such software. The network interface device may include one or more antennas for communicating with the wireless network.

Other communication systems that may incorporate the above-described embodiments may include: cellular wide area radio communication technology (which may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WIDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-70 GHz and above).

The Abstract is submitted with the understanding that it will not be used to limit or interpret the scope or meaning of the claims. The following claims are hereby incorporated into the detailed description, with each claim standing on its own as a separate embodiment.

EXAMPLES

The following examples pertain to further embodiments.

Example 1 is a licensed shared access (LSA) message entity configured to convey reverse link messages from an LSA controller to one or more target incumbent frequency licensees, the LSA controller configured to control LSA frequency spectrum availability for use by eNodeBs.

In Example 2, the subject matter of Example 1 can optionally include wherein the LSA message entity is further configured to determine an identification of each of the one or more target incumbent frequency licensees and incorporate the identification in the reverse link messages to the one or more target incumbent frequency licensees.

In Example 3, the subject matter of Examples 1-2 can optionally include wherein the LSA message entity is further configured to include an indication of identification of a wireless communication system operator in the reverse link messages.

In Example 4, the subject matter of Examples 1-3 can optionally include wherein the LSA message entity is further configured to access an LSA repository to determine the identification of each of the one or more target incumbent frequency licensees.

In Example 5, the subject matter of Examples 1-4 can optionally include wherein the LSA message entity is further configured to access an LSA repository to determine a communication protocol used by each of the one or more target incumbent frequency licensees.

In Example 6, the subject matter of Examples 1-5 can optionally include an operation administration and maintenance (OA&M) apparatus configured to communicate between the LSA controller and the eNodeBs, wherein the LSA message entity is further configured to receive the reverse link message from the OA&M apparatus.

In Example 7, the subject matter of Examples 1-6 can optionally include wherein the OA&M apparatus is further configured to translate information regarding spectrum availability into radio resource management commands from the LSA controller and transmit the radio resource management commands to the eNodeBs.

In Example 8, the subject matter of Examples 1-7 can optionally include wherein the LSA message entity is further configured to receive an acknowledgement message from a source incumbent frequency licensee, identify a target system operator for the acknowledgement message, determine a communications protocol for the target system operator, and transmit the acknowledgement message to the target system operator wherein the acknowledgement message includes an indication of the source incumbent frequency licensee.

In Example 9, the subject matter of Examples 1-8 can optionally include wherein the LSA message entity is part of the LSA controller.

In Example 10, the subject matter of Examples 1-9 can optionally include wherein the LSA message entity is part of the LSA controller and/or an LSA repository.

In Example 11, the subject matter of Examples 1-10 can optionally include wherein the LSA controller is further configured to: check an LSA repository for LSA spectrum availability; monitor a channel for incoming messages; and update information in the LSA repository, in response to the incoming messages, regarding the availability of particular LSA spectrum.

In Example 12, the subject matter of Examples 1-11 can optionally include an authentication module configured to handle an initialization state of the LSA controller; a repository communications module configured to handle corresponding communication mechanisms within the wireless communication system, provide the LSA repository with triggers, processed information and/or related decisions, or receive messages from external entities; a controller core module configured to process information from the LSA repository regarding LSA spectrum analysis, information from incumbents, and/or information from LSA licensees; and a reconfiguration module configured to change a configuration of the LSA licensees based on the processed information and/or based on received triggers.

In Example 13, the subject matter of Examples 1-12 can optionally include wherein the LSA message entity is further configured to transmit information from the system operator that includes frequency spectrum not being used by the eNodeBs.

Example 14 is a method for licensed shared access (LSA) reverse link and message feedback control, the method comprising: receiving a reverse link feedback message from a source system operator, the feedback message comprising an indication of a target incumbent frequency licensee; determining an identification and a communication protocol for the target incumbent frequency licensee in response to the indication; and forwarding the feedback message to the target incumbent frequency licensee in response to the identification and communication protocol.

In Example 15, the subject matter of Example 14 can optionally include the LSA message entity receiving an acknowledgement message from the target incumbent frequency licensee, the acknowledgement comprising an indication of the source system operator; the LSA message entity determining an identification and a communication protocol of the source system operator for the acknowledgement message in response to the indication of the source system operator; and the LSA message entity transmitting the acknowledgement message to the source system operator in response to the identification and the communication protocol.

In Example 16, the subject matter of Examples 14-15 can optionally include the LSA message entity transmitting the indication of identification of the source system operator in the feedback message.

In Example 17, the subject matter of Examples 14-16 can optionally include the LSA message entity transmitting the indication of identification of the target incumbent frequency licensee in the acknowledgement message.

In Example 18, the subject matter of Examples 14-17 can optionally include the LSA message entity updating an LSA repository in response to LSA frequency spectrum availability changes in time, frequency, and/or space) after transmitting the acknowledgement message to the source system operator.

In Example 19, the subject matter of Examples 14-18 can optionally include the LSA feedback message controller controlling routing of data, through the LSA repository, between the target incumbent frequency licensee and the source system operator.

In Example 20, the subject matter of Examples 14-19 can optionally include: the LSA message entity transmitting a reverse link message to the target incumbent frequency licensee from the source system operator when an indication of available LSA frequency spectrum is unusable by the system operator.

In Example 21, the subject matter of Examples 14-20 can optionally include the LSA message entity transmitting a reverse link message from the source system operator, wherein the reverse link message comprises a request for additional time for using LSA frequency spectrum or additional LSA frequency spectrum in addition to LSA frequency spectrum already in use by the source system operator.

Example 22 is a non-transitory computer-readable storage medium that stores instructions for execution by one or more processors to perform operations for a licensed shared access (LSA) message entity, the operations causing the LSA message entity to: receive a reverse link feedback message from a source system operator, the feedback message comprising an indication of a target incumbent frequency licensee; determine an identification and a communication protocol for the target incumbent frequency licensee in response to the indication; and forward the feedback message to the target incumbent frequency licensee in response to the identification and communication protocol.

In Example 23, the subject matter of Example 22 can optionally include wherein the operations further cause the LSA message entity to: receive an acknowledgement message from the target incumbent frequency licensee, the acknowledgement comprising an indication of the source system operator; determine an identification and a communication protocol of the source system operator for the acknowledgement message in response to the indication of the source system operator; and transmit the acknowledgement message to the source system operator in response to the identification and the communication protocol.

In Example 24, the subject matter of Examples 22-23 can optionally include wherein the operations further cause the LSA message entity to: control routing of data, through an LSA repository, between the target incumbent frequency licensee and the source system operator.

In Example 25, the subject matter of Examples 22-24 can optionally include wherein the operations further cause the LSA message feedback controller to: access the LSA repository to determine an identification and communication protocol of the target incumbent frequency licensee and/or the source system operator.

In Example 26, the subject matter of Examples 22-25 can optionally include wherein the operations further cause the LSA message entity to:

update the LSA repository in response to LSA frequency spectrum availability changes in time, frequency, and/or space).

What is claimed is:

1. A shared spectrum message feedback controller configured for communicating with a shared spectrum controller and one or more target incumbents, wherein the target incumbents are primary users of shared spectrum and are configured to grant access to the shared spectrum, the shared spectrum message feedback controller further configured to communicate with a shared spectrum repository comprising representations of spectrum use by the one or more target incumbents, the shared spectrum message feedback controller comprising memory and processing circuitry configured to convey confidential reverse link messages over a secure link from the shared spectrum controller to a selected one of the one or more target incumbents, the shared spectrum controller configured to control shared spectrum availability for use by base stations configured to communicate with the one or more communication system operators, wherein each of the reverse link messages includes a request from one of the communication system operators.

2. The shared spectrum message feedback controller of claim 1, wherein the shared spectrum message feedback controller is further configured to determine an identification of each of the one or more target incumbents and to incorporate the identification in the reverse link messages to the selected one of the one or more target incumbents.

3. The shared spectrum message feedback controller of claim 2, wherein the shared spectrum message feedback controller is further configured to include an indication of identification of a wireless communication system operator in the reverse link messages.

4. The shared spectrum message feedback controller of claim 2, wherein the shared spectrum message feedback controller is further configured to access the shared spectrum repository to determine the identification of each of the one or more target incumbents.

5. The shared spectrum message feedback controller of claim 2, wherein the shared spectrum message feedback controller is further configured to access the shared spectrum repository to determine a communication protocol used by each of the one or more target incumbents.

6. The shared spectrum message feedback controller of claim 1, wherein the communication system operator further comprises an operation administration and maintenance (OA&M) apparatus configured to communicate between the shared spectrum controller and the base stations, wherein the shared spectrum message feedback controller is further configured to receive the reverse link message from the OA&M apparatus.

7. The shared spectrum message feedback controller of claim 6, wherein the base stations are enhanced NodeB (eNodeBs) and the OA&M apparatus is further configured to translate information regarding spectrum availability into radio resource management commands from the licensed spectrum controller and transmit the radio resource management commands to the eNodeBs.

8. The shared spectrum message feedback controller of claim 1, wherein the shared spectrum message feedback controller is further configured to receive an acknowledgement message from the selected one of the one or more target incumbents, identify a target system operator for the acknowledgement message, determine a communications protocol for the target system operator, and transmit the acknowledgement message to the target system operator wherein the acknowledgement message includes an indication of the selected incumbent.

9. The shared spectrum message feedback controller of claim 1, wherein the shared spectrum message feedback controller is part of the shared spectrum controller.

10. The shared spectrum message feedback controller of claim 1, wherein the shared spectrum message feedback controller is part of at least one of the shared spectrum controller or the shared spectrum repository.

11. The shared spectrum message feedback controller of claim 10, wherein the shared spectrum controller is further configured to:

check the shared spectrum repository for availability of shared spectrum;

monitor a channel for incoming messages; and update information in the shared spectrum repository, in response to the incoming messages, regarding the availability of particular shared spectrum.

12. The shared spectrum message feedback controller of claim 11, wherein the shared spectrum controller further comprises:
an authentication module configured to handle an initialization state of the shared spectrum controller;
a repository communications module configured: to handle corresponding communication mechanisms within the wireless communication system, to provide the shared spectrum repository with one or more of triggers, processed information or related decisions, or to receive messages from external entities;
a controller core module configured to process information from the shared spectrum repository regarding at least one of shared spectrum analysis, information from incumbents, or information from the one or more communication system operators; and
a reconfiguration module configured to change a configuration of the one or more communication system operators based on at least one of the processed information or received triggers.

13. The shared spectrum message feedback controller of claim 1, wherein the shared spectrum message feedback controller is further configured to transmit information from one of the communication system operators that includes frequency spectrum not being used by the base stations.

14. The shared spectrum message feedback controller or claim 1, wherein the shared spectrum controller is one of a spectrum access system (SAS) controller or a Licensed Shared Access (LSA) controller.

15. The shared spectrum message feedback controller of claim 1, wherein the one or more communication system operators include at least one of a Citizens Broadband Service Device (CBSD), an Access Point (AP), or an evolved NodeB (eNB).

16. A method for shared spectrum reverse link and message feedback control, the method comprising:
a shared spectrum message feedback controller receiving a reverse link feedback message from a communication system operator via a shared spectrum controller coupled to the communication system operator, the feedback message comprising a request from the communication system operator and an indication of a target incumbent wherein the target incumbent is a primary user of a shared spectrum and is configured to grant access to the shared spectrum;
the shared spectrum message feedback controller determining an identification and a communication protocol for the target incumbent in response to the indication; and
the shared spectrum message feedback controller forwarding the feedback message over a secure link from the shared spectrum controller to the target incumbent in response to the identification and communication protocol.

17. The method of claim 16, further comprising:
the message feedback controller receiving an acknowledgement message from the target incumbent, the acknowledgement comprising an indication of the communication system operator;
the shared spectrum message feedback controller determining an identification and a communication protocol of the communication system operator for the acknowledgement message in response to the indication of the communication system operator; and
the shared spectrum message feedback controller transmitting the acknowledgement message to the shared spectrum controller coupled to the communication system operator in response to the identification and the communication protocol.

18. The method of claim 17, further comprising the shared spectrum message feedback controller transmitting the indication of identification of the communication system operator in the feedback message.

19. The method of claim 17, further comprising the shared spectrum message feedback controller transmitting the indication of identification of the target incumbent in the acknowledgement message.

20. The method of claim 17, further comprising the shared spectrum message feedback controller updating the shared spectrum repository in response to shared spectrum availability changes in at least one of time, frequency, or space after transmitting the acknowledgement message to the shared spectrum controller coupled to the communication system operator.

21. The method of claim 20, further comprising the shared spectrum message feedback controller controlling routing of data, through the shared spectrum repository, between the target incumbent and the shared spectrum controller coupled to the communication system operator.

22. The method of claim 17, further comprising:
the shared spectrum message feedback controller transmitting a reverse link message to the target incumbent from the communication system operator when an indication of available shared spectrum is unusable by the system operator.

23. The method of claim 17, further comprising the shared spectrum message feedback controller transmitting a reverse link message from the communication system operator, wherein the reverse link message comprises a request for additional time for using shared spectrum or additional shared spectrum in addition to shared spectrum already in use by the communication system operator.

24. A non-transitory computer-readable storage medium that stores instructions for execution by one or more processors to perform operations for a shared spectrum message feedback controller the operations causing the shared spectrum message feedback controller to:
receive a reverse link feedback message from a communication system operator via a shared spectrum controller of coupled to the communication system operator, the feedback message comprising a request from the communication system operator an indication of a target incumbent, wherein the target incumbent is a primary user of shared spectrum and is configured to grant access to the shared spectrum;
determine an identification and a communication protocol for the target incumbent in response to the indication; and
forward the feedback message over a secure link from the shared spectrum controller to the target incumbent in response to the identification and communication protocol.

25. The non-transitory computer-readable storage medium of claim 24, wherein the operations further cause the shared spectrum message feedback controller to:
receive an acknowledgement message from the target incumbent, the acknowledgement comprising an indication of the communication system operator;
determine an identification and a communication protocol of the communication system operator for the acknowledgement message in response to the indication of the communication system operator; and transmit the acknowledgement message to the shared spectrum controller coupled to the communication system operator in response to the identification and the communication protocol.

26. The non-transitory computer-readable storage medium of claim 25, wherein the operations further cause the shared spectrum message feedback controller to:

control routing of data, through a shared spectrum repository, between the target incumbent and the shared spectrum controller coupled to the communication system operator.

27. The non-transitory computer-readable storage medium of claim 26, wherein the operations further cause the shared spectrum message feedback controller to:

access the shared spectrum repository to determine an identification and communication protocol of one or more of the target incumbent or the communication system operator.

28. The non-transitory computer-readable storage medium of claim 26, wherein the operations further cause the shared spectrum message feedback controller to:

update the shared spectrum repository in response to shared spectrum availability changes in at least one of time, frequency, or space.

29. An apparatus for a Licensed Shared Access (LSA) licensee, the LSA licensee comprising a processor configured to:

generate a reverse link message requesting additional spectrum;

transmit the reverse link message to a shared spectrum message feedback controller for transmission to one or more target incumbents, wherein the target incumbents are primary users of shared spectrum and are configured to grant access to the shared spectrum;

receive a message from the message feedback controller, the received message including a grant of additional spectrum; and access to the additional spectrum.

30. The apparatus of claim 29, wherein the LSA licensee is a base station of a communication system operator.

31. The apparatus of claim 30 wherein the additional spectrum includes another frequency band and the base station hands-off a user equipment (UE) served by the base station to the other frequency band.

32. The apparatus of claim 30, wherein the base station includes at least one of a Citizens Broadband Service Device (CBSD), an Access Point (AP), or an evolved NodeB (eNodeB).

* * * * *

UNITED STATES PATENT AND TRADEMARK OFFICE
CERTIFICATE OF CORRECTION

PATENT NO. : 10,104,662 B2
APPLICATION NO. : 14/575168
DATED : October 16, 2018
INVENTOR(S) : Mueck et al.

Page 1 of 1

It is certified that error appears in the above-identified patent and that said Letters Patent is hereby corrected as shown below:

In the Claims

In Column 15, Line 29, in Claim 14, delete "or" and insert --of-- therefor

Signed and Sealed this
Fourth Day of June, 2019

Andrei Iancu
*Director of the United States Patent and Trademark Office*